United States Patent
Wang et al.

(10) Patent No.: US 10,290,066 B2
(45) Date of Patent: May 14, 2019

(54) METHOD AND DEVICE FOR MODELING A LONG-TIME-SCALE PHOTOVOLTAIC OUTPUT TIME SEQUENCE

(71) Applicants: China Electric Power Research Institute Company Limited, Beijing (CN); State Grid Corporation of China, Beijing (CN); CLP Puri Zhangbei Wind Power Research & Testing Co., Ltd., Zhangjiakou (CN)

(72) Inventors: Weisheng Wang, Beijing (CN); Chun Liu, Beijing (CN); Chi Li, Beijing (CN); Yuehui Huang, Beijing (CN); Yuefeng Wang, Beijing (CN); Cun Dong, Beijing (CN); Nan Zhang, Beijing (CN); Xiaofei Li, Beijing (CN); Yunfeng Gao, Beijing (CN); Xiaoyan Xu, Beijing (CN); Yanping Xu, Beijing (CN); Xiaofeng Pan, Beijing (CN)

(73) Assignees: China Electric Power Research Institute Company Li, Beijing (CN); State Grid Corporation of China, Beijing (CN); CLP Puri Zhangbei Wind Power Research & Testing Co, Zhangjiakou (CN)

( * ) Notice: Subject to any disclaimer, the term of this patent is extended or adjusted under 35 U.S.C. 154(b) by 0 days.

(21) Appl. No.: 15/963,073

(22) Filed: Apr. 25, 2018

(65) Prior Publication Data
US 2018/0240048 A1  Aug. 23, 2018

Related U.S. Application Data

(63) Continuation of application No. 15/751,471, filed as application No. PCT/CN2016/087809 on Jun. 30, 2016.

(30) Foreign Application Priority Data

Sep. 30, 2015 (CN) .......................... 2015 1 0639474

(51) Int. Cl.
G06Q 10/04 (2012.01)
G06Q 50/06 (2012.01)

(52) U.S. Cl.
CPC ............. *G06Q 50/06* (2013.01); *G06Q 10/04* (2013.01); *F24S 2201/00* (2018.05)

(58) Field of Classification Search
CPC ............................ G06Q 10/04; G06Q 50/06
(Continued)

(56) References Cited

U.S. PATENT DOCUMENTS

2010/0141046 A1\* 6/2010 Paik .................... H02J 3/14
307/126
2011/0066401 A1   3/2011 Yang
(Continued)

FOREIGN PATENT DOCUMENTS

CN   103810534 A    5/2014
CN   104182889 A    12/2014
(Continued)

OTHER PUBLICATIONS

CN104182914 Espacenet translation (Year: 2014).\*
(Continued)

*Primary Examiner* — Thomas C Lee
*Assistant Examiner* — Alan Chu
(74) *Attorney, Agent, or Firm* — Oppedahl Patent Law Firm LLC (57) ABSTRACT

A method and device for modeling a long-time-scale photovoltaic output time sequence are provided. The method includes that: historical data of a photovoltaic power station is acquired, and a photovoltaic output with a time length of one year and a time resolution of 15 mins is selected (101); weather types of days corresponding to the photovoltaic output are acquired from a weather station (102), and probabilities of transfer between each type of weather are calculated respectively (103); and a simulated time sequence of the photovoltaic output within a preset time scale is generated (104), and its validity is verified (105). By the (Continued)

method, annual and monthly photovoltaic output simulated time sequences consistent with a random fluctuation rule of a photovoltaic time sequence may be acquired according to different requirements to provide a favorable condition and a data support for analog simulation of time sequence production including massive new energy.

9 Claims, 5 Drawing Sheets

(58) Field of Classification Search
USPC .......................................................... 700/191
See application file for complete search history.

(56) References Cited

U.S. PATENT DOCUMENTS

2014/0012428 A1* 1/2014 Taniguchi ................. H02J 7/35
700/291

2014/0358307 A1* 12/2014 Taniguchi ................. H02J 3/32
700/291

FOREIGN PATENT DOCUMENTS

| CN | 104182914 | * 12/2014 | ............. G06Q 50/06 |
| CN | 104182914 A | 12/2014 | |
| CN | 104218574 A | 12/2014 | |
| CN | 104616078 A | 5/2015 | |

OTHER PUBLICATIONS

English Translation of International Search Report in international application No. PCT/CN2016/087809, dated Oct. 8, 2016.
English Translation of the Written Opinion of the International Search Authority in international application No. PCT/CN2016/087809, dated Oct. 8, 2016.
Li, Chi; "Study on the Modeling Method of New Energy Power Time Series Based on Fluctuation Characteristics", Science-Engineering (B), China Master's Theses Full-Text Database, No. 12, Dec. 15, 2015 (Dec. 15, 2015), ISSN: 1674-0246, C042-224.

* cited by examiner

METHOD AND DEVICE FOR MODELING A LONG-TIME-SCALE PHOTOVOLTAIC OUTPUT TIME SEQUENCE

CROSS-REFERENCE TO RELATED APPLICATIONS

This is a continuation application of U.S. patent application Ser. No. 15/751,471 filed on Feb. 8, 2018, which is a national phase application of PCT/CN2016/087809 filed on Jun. 30, 2016 claiming priority to Chinese Patent Application No. 201510639474.5 filed on Sep. 30, 2015, the disclosure of these applications are incorporated by reference herein in their entireties.

TECHNICAL FIELD

The disclosure relates to a modeling technology, and particularly to a method and device for modeling a long-time-scale photovoltaic output time sequence.

BACKGROUND

Photovoltaic power generation is a renewable energy technology with greatest potential and highest application value after wind power generation, and photovoltaic power generation is rapidly developed in China under the support of a series of supporting policies. Along with increase of a proportion of photovoltaic power generation in power of the whole power system, deeply understanding a characteristic and rule of photovoltaic output may accurately master influence of photovoltaic grid connection on the power system and enable the power system to more effectively solve a problem about photovoltaic access.

An existing weather simulation technology may only implement annual/monthly photovoltaic power prediction, may not implement long-time-scale power prediction, and may not directly obtain a time sequence useful for analogue simulation of time sequence production of a power system. Therefore, it is necessary to model a photovoltaic output time sequence to accurately master an output change rule of photovoltaic power generation and provide indispensable basic data for analogue simulation of time sequence production including massive new energy, annual new energy resource consumption capability analysis and annual planning.

SUMMARY

In order to achieve the purpose, an embodiment of the disclosure provides a long-time-scale photovoltaic output time sequence modeling method. A characteristic of a photovoltaic output time sequence is analyzed, and a Markov chain is adopted to simulate transfer processes of each weather type and acquire probabilities of transfer to generate a simulated photovoltaic sequence, thereby proposing a new method to build a future photovoltaic output scenario.

The embodiment of the disclosure is implemented by adopting the following technical solution.

The embodiment of the disclosure provides a method for modeling a long-time-scale photovoltaic output time sequence, which includes that:

historical data of a photovoltaic power station is acquired, and a photovoltaic output with a time length of one year and a time resolution of 15 mins is selected;

weather types of days corresponding to the photovoltaic output is acquired, the weather types including at least one of clear weather, cloudy weather, overcast weather or changing weather;

probabilities of transfer between each type of weather are calculated respectively;

a simulated time sequence of the photovoltaic output within a preset time scale is generated; and validity of the simulated time sequence is verified.

A power system is thus managed by using the validated simulated time sequence.

In an implementation mode of the embodiment of the disclosure, the operation that the probabilities of transfer between each type of weather are calculated respectively includes that: a Markov chain is adopted to simulate transfer processes of each type of weather and acquire the probabilities of transfer between each weather type, an expression being:

$$P_k = \frac{N_k}{N_1}, \quad (1)$$

in formula (1), $P_k$ being the probability of transfer of the clear weather to another weather type, k representing a weather type, $N_k$ being a number of times of transfer and $N_1$ being a number of times of occurrence of the clear weather.

In an implementation mode of the embodiment of the disclosure, the following step is further included: the probabilities of transfer between the other weather types are sequentially obtained by virtue of a method for calculating the probabilities of transfer of the clear weather to the other weather types.

In an implementation mode of the embodiment of the disclosure, the operation that the simulated time sequence of the photovoltaic output within the preset time scale is generated includes that: the weather types and corresponding relative outputs within the preset time scale are sequentially and randomly extracted according to the probabilities of transfer between each weather type, and products of the relative outputs and a predetermined threshold value are calculated to generate the simulated time sequence of the photovoltaic output, wherein the simulated time sequence is a curve chart for reflecting changes of a Probability Density Function (PDF), an Autocorrelation Function (ACF) and short-duration fluctuation characteristic of photovoltaic output of multiple time scales;

the short-duration fluctuation characteristic is a maximum PDF of the photovoltaic output within a time scale t, 15 min≤t≤60 min;

the maximum PDF is a difference value between a maximum output and a minimum output within the time scale t; and the difference value is positive if the maximum output appears after the minimum output, and the difference value is negative if it appears before the minimum output.

In an implementation mode of the embodiment of the disclosure, the operation that the validity of the simulated time sequence is verified includes that:

the PDF $C_f$, short-duration fluctuation characteristic $C_d$ and ACF $C_r$ of the simulated time sequence are defined respectively; and a Root-Mean-Square Error (RMSE) of each characteristic is adopted to quantitatively evaluate the validity of the time sequence, an expression being:

$$RMSE = \sqrt{\frac{1}{n} \cdot \sum_{i=1}^{n} (\bar{y}_i - y_i)^2},$$

where $\widehat{y_i} \in [C_f, C_d, C_r]$, $\hat{y}_i$ is a unit vector, and represents a function value of each characteristic of the simulated time sequence, $y_i$ represents a function value of each characteristic, corresponding to each characteristic of the simulated time sequence, of a historical time sequence, n is a length of a function value set of each characteristic of the time sequence, RMSE is smaller than ε with a value range of 0.1~0.2.

An embodiment of the disclosure provides a device for modeling a long-time-scale photovoltaic output time sequence, wherein the device includes:

a data acquisition unit, configured to acquire historical data of a photovoltaic power station, and select a photovoltaic output with a time length of one year and a time resolution of 15 mins;

an acquisition unit, configured to acquire weather types of days corresponding to the photovoltaic output from a weather station, the weather types including at least one of clear weather, cloudy weather, overcast weather or changing weather;

a processing unit, configured to calculate probabilities of transfer between each type of weather respectively;

a generation unit, configured to generate a simulated time sequence of the photovoltaic output within a preset time scale; and an evaluation unit, configured to verify validity of the simulated time sequence.

In an implementation mode of the embodiment of the disclosure, the processing unit is further configured to: adopt a Markov chain to simulate transfer processes of each type of weather and acquire the probabilities of transfer between each weather type, an expression being:

$$P_k = \frac{N_k}{N_1}, \quad (1)$$

in formula (1), $P_k$ being the probability of transfer of the clear weather to another weather type, k representing a weather type, $N_k$ being a number of times of transfer and $N_1$ being a number of times of occurrence of the clear weather.

In an implementation mode of the embodiment of the disclosure, the device further includes: a probability acquisition unit, configured to sequentially obtain the probabilities of transfer between the other weather types by virtue of a method for calculating the probabilities of transfer of the clear weather to the other weather types.

In an implementation mode of the embodiment of the disclosure, the generation unit is further configured to: sequentially and randomly extract the weather types and corresponding relative outputs within the preset time scale according to the probabilities of transfer between each weather type, and calculate products of the relative output and a predetermined threshold value to generate the simulated time sequence of the photovoltaic output, wherein the simulated time sequence is a curve chart for reflecting changes of a PDF, ACF and short-duration fluctuation characteristic of photovoltaic output of multiple time scales;

the short-duration fluctuation characteristic is a maximum PDF of the photovoltaic output within a time scale t, 15 min≤t≤60 min;

the maximum PDF is a difference value between maximum output and minimum output within the time scale t; and the difference value is positive if the maximum output appears after the minimum output, and the difference value is negative if it appears before the minimum output.

In an implementation mode of the embodiment of the disclosure, the evaluation unit is further configured to:

define the PDF $C_f$, short-duration fluctuation characteristic $C_d$ and ACF $C_r$ of the simulated time sequence respectively; and adopt an RMSE of each characteristic to quantitatively evaluate the validity of the time sequence, an expression being:

$$RMSE = \sqrt{\frac{1}{n} \cdot \sum_{i=1}^{n} (\bar{y}_i - y_i)^2},$$

where $\widehat{y_i} \in [C_f, C_d, C_r]$, $\hat{y}_i$ is a unit vector and represents a function value of each characteristic of the simulated time sequence, $y_i$ represents a function value of each characteristic, corresponding to each characteristic of the simulated time sequence, of a historical time sequence, n is a length of a function value set of each characteristic of the time sequence, RMSE is smaller than ε with a value range of 0.1~0.2.

Compared with a conventional art, adopting the embodiments of the disclosure may achieve the following beneficial effects: the Markov chain is adopted to simulate the transfer processes of each type of weather and calculate the probabilities of transfer between each weather type; and uncertain characteristics such as randomness and fluctuation of photovoltaics are simulated, and compared with other methods, a building structure is more consistent with characteristics of the photovoltaic output, and truthfully and accurately represent a future photovoltaic output condition. Annual and monthly photovoltaic output simulation time sequences consistent with a random fluctuation rule of a photovoltaic time sequence may be generated according to a requirement to provide indispensable basic data for analogue simulation of time sequence production including massive new energy, annual new energy resource consumption capability analysis and annual planning.

BRIEF DESCRIPTION OF DRAWINGS

FIG. 2-FIG. 5 are schematic diagrams of parameter comparison between a historical time sequence and a simulated time sequence according to an embodiment of the disclosure, wherein

DETAILED DESCRIPTION

Specific implementation modes of the disclosure will be further described below in combination with the drawings in detail.

Figure 1:
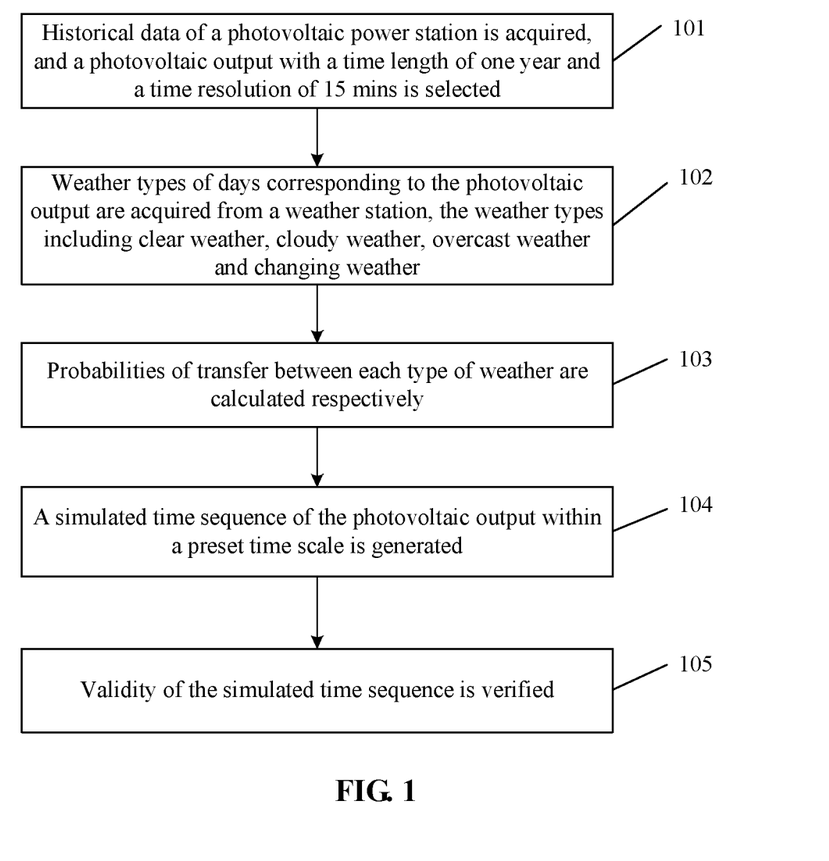
FIG. 1 is a flowchart of a long-time-scale photovoltaic output time sequence modeling method according to an embodiment of the disclosure.

FIG. 1 shows a long-time-scale photovoltaic output time sequence modeling method according to an embodiment of the disclosure. The method includes the following steps.

In Step 101, historical data of a photovoltaic power station is acquired, and a photovoltaic output with a time length of one year and a time resolution of 15 mins is selected.

In Step 102, weather types of days corresponding to the photovoltaic output are acquired from a weather station, the weather types including clear weather, cloudy weather, overcast weather and changing weather.

In Step 103, probabilities of transfer between each type of weather are calculated respectively, a Markov chain being adopted to simulate transfer processes of each type of weather and acquire the probabilities of transfer between each weather type, an expression being:

$$P_k = \frac{N_k}{N_1}, \quad (1)$$

in formula (1), $P_k$ being the probability of transfer of the clear weather to another weather type, k representing a weather type, $N_k$ being a number of times of transfer and $N_1$ being a number of times of occurrence of the clear weather.

The probabilities of transfer between the other weather types are sequentially obtained by virtue of a method for calculating the probabilities of transfer of the clear weather to the other weather types.

For example, expressions for calculating the probabilities of transfer of the cloudy weather to the other weather types are:

$$P_{(1)1} = \frac{N_{(1)1}}{N_{(1)}},$$

$$P_{(1)2} = \frac{N_{(1)2}}{N_{(1)}},$$

$$P_{(1)3} = \frac{N_{(1)3}}{N_{(1)}} \text{ and}$$

$$P_{(1)4} = \frac{N_{(1)4}}{N_{(1)}},$$

in the formulae, subscript 1 being adopted for the cloudy weather type, subscript 2 being adopted for the clear weather type, subscript 3 being adopted for the overcast weather type, subscript 4 being adopted for the changing weather type, $P_{(1)1}$, $P_{(1-2)}$, $P_{(1-3)}$ and $P_{(1-4)}$ representing the probabilities of transfer of the cloudy weather type to the other weather types respectively, $N_{(1-1)}$, $N_{(1-2)}$, $N_{(1-3)}$ and $N_{(1-4)}$ representing numbers of times of transfer of the cloudy weather to the other weather types respectively, and $N_{(1)}$ representing a number of times of occurrence of the cloudy weather type. Similarly, the probabilities of transfer of the overcast weather and the changing weather may be calculated.

In Step 104, a simulated time sequence of the photovoltaic output within a preset time scale is generated.

The weather types and corresponding relative outputs within the preset time scale are sequentially and randomly extracted according to the probabilities of transfer between each weather type, and products of the relative outputs and a predetermined threshold value are calculated to generate the simulated time sequence of the photovoltaic output. The predetermined threshold value is a standard value customized according to historical photovoltaic data and a historical time sequence. The simulated time sequence is a curve chart and is configured to reflect changes of a PDF, ACF and short-duration fluctuation characteristic of photovoltaic output of multiple time scales.

The short-duration fluctuation characteristic is a maximum PDF of the photovoltaic output within a time scale t, 15 min ≤ t ≤ 60 min.

The maximum PDF is a difference value between a maximum output and a minimum output within the time scale t; and the difference value is positive if the maximum output appears after the minimum output, and the difference value is negative if it appears before the minimum output.

In Step 105, validity of the simulated time sequence is verified, as shown in each schematic diagram of FIG. 2 to FIG. 5.

Here, a specific processing process of the step includes the following steps.

In Step 1051, the PDF $C_f$, short-duration fluctuation characteristic $C_d$ and ACF $C_r$ of the simulated time sequence are defined respectively.

In Step 1052, an RMSE of each characteristic is adopted to quantitatively evaluate the validity of the time sequence, an expression being:

$$RMSE = \sqrt{\frac{1}{n} \cdot \sum_{i=1}^{n} (\hat{y}_i - y_i)^2},$$

where $\hat{y}_i \in [C_f, C_d, C_r]$, $\hat{y}_i$ is a unit vector, and represents a function value of each characteristic of the simulated time sequence, $y_i$ represents a function value of each characteristic, corresponding to each characteristic of the simulated time sequence, of the historical time sequence, n is a length of a function value set of each characteristic of the time sequence, RMSE is smaller than ε with a value range of 0.1~0.2.

Figure 2:
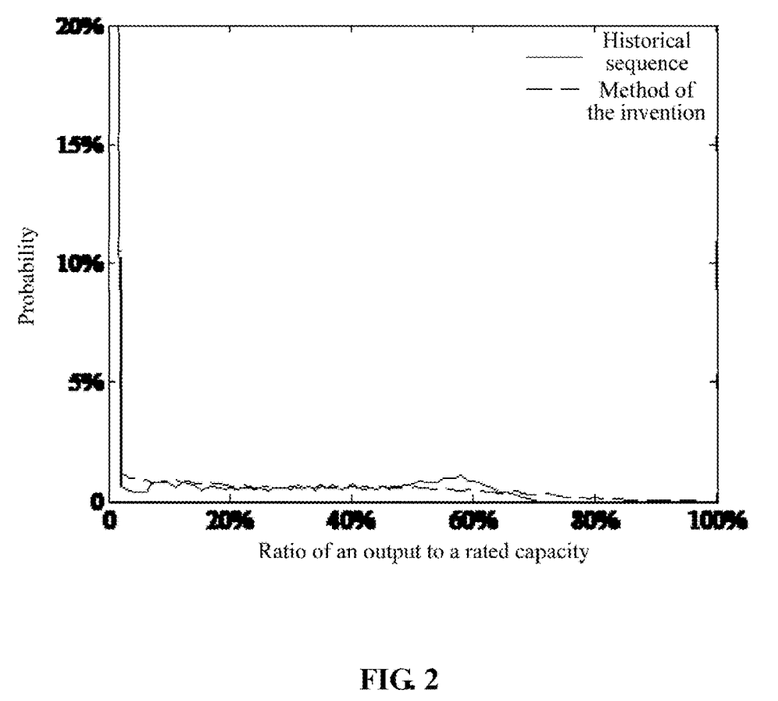
FIG. 2 is a schematic diagram of a probability density.
Figure 3:
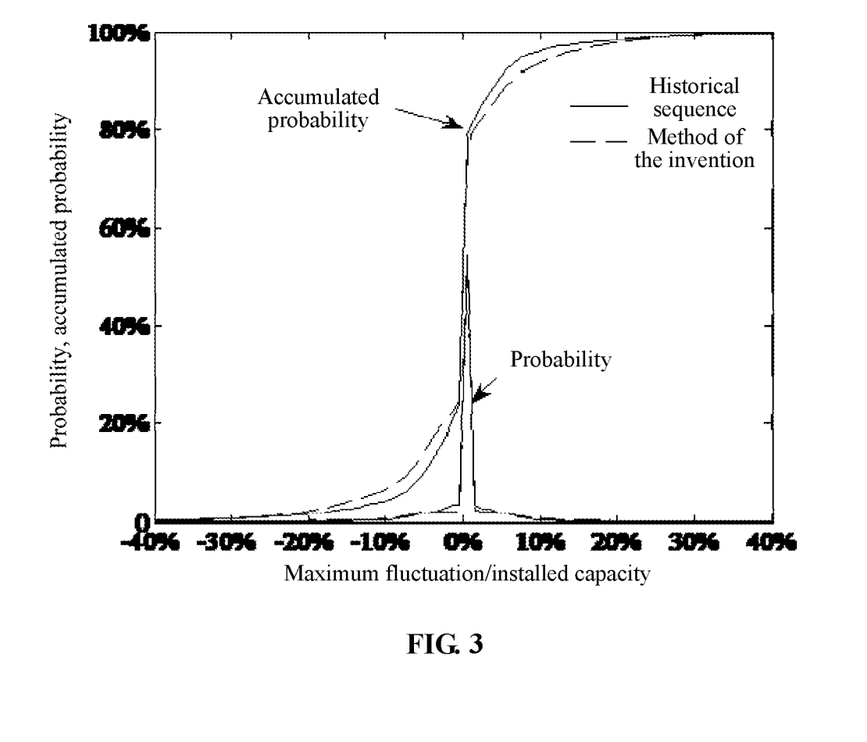
FIG. 3 is a schematic diagram of a 15 min probability density.
Figure 4:
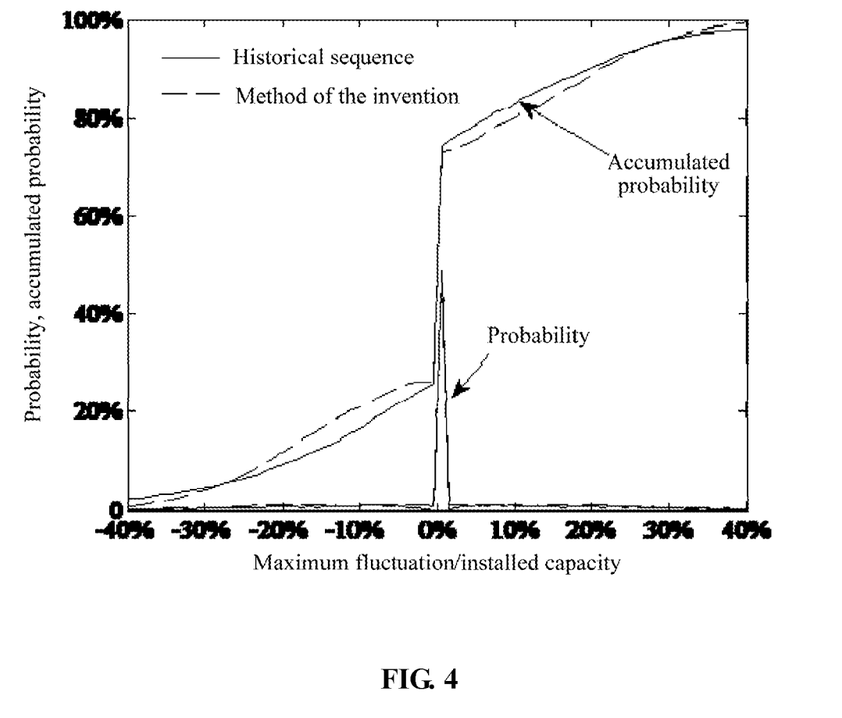
FIG. 4 is a schematic diagram of a 60 min probability density.
Figure 5:
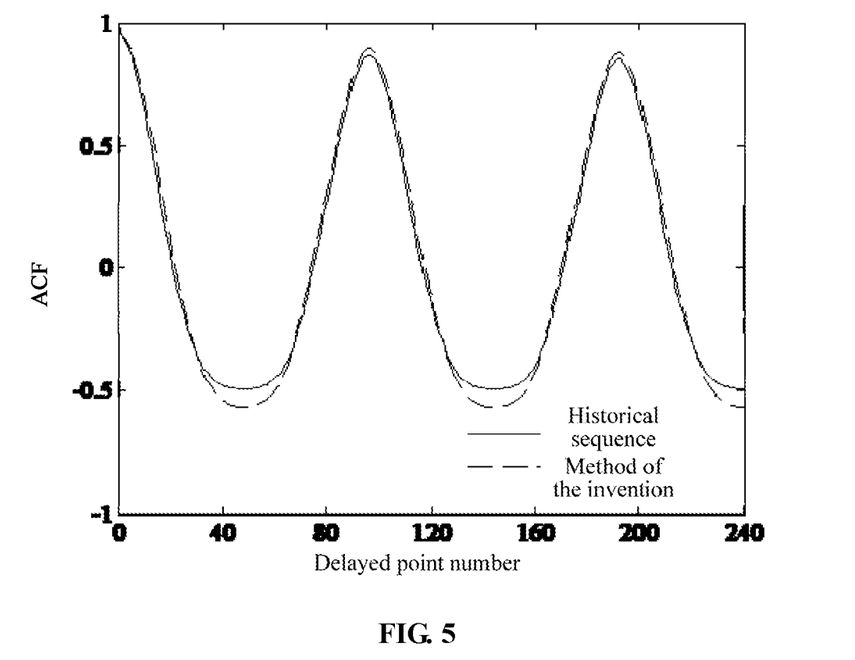
FIG. 5 is a schematic diagram of autocorrelation coefficient comparison.

FIG. 2 is a schematic diagram of a probability density. As shown in FIG. 2, when $\hat{y}_i \in C_f$, the function value of the PDF of the simulated time sequence is represented, and at this moment, $y_i$ represents the function value of the PDF, corresponding to the PDF of the simulated time sequence, of the historical time sequence. FIG. 3 is a schematic diagram of a 15 min probability density, and FIG. 4 is a schematic diagram of a 60 min probability density. As shown in FIG. 3 and FIG. 4, when $\hat{y}_i \in C_d$, the function value of the short-duration fluctuation characteristic of the simulated time sequence is represented, and at this moment, $y_i$ represents the function value of the short-duration fluctuation characteristic, corresponding to the short-duration fluctuation characteristic of the simulated time sequence, of the historical time sequence. FIG. 5 is a schematic diagram of autocorrelation coefficient comparison. As shown in FIG. 5, when $\hat{y}_i \in C_r$, the function value of the ACF of the simulated time sequence is represented, and at this moment, $y_i$ represents the function value of the ACF, corresponding to the ACF of the simulated time sequence, of the historical time sequence.

An embodiment of the disclosure provides a long-time-scale photovoltaic output time sequence modeling device, which includes:

a data acquisition unit, configured to acquire historical data of a photovoltaic power station, and select a photovoltaic output with a time length of one year and a time resolution of 15 mins;

an acquisition unit, configured to acquire weather types of days corresponding to the photovoltaic output from a weather station, the weather types including clear weather, cloudy weather, overcast weather and changing weather;

a processing unit, configured to calculate probabilities of transfer between each type of weather respectively;

a generation unit, configured to generate a simulated time sequence of the photovoltaic output within a preset time scale; and an evaluation unit, configured to verify validity of the simulated time sequence.

In an implementation mode of the embodiment of the disclosure, the processing unit is further configured to: adopt a Markov chain to simulate transfer processes of each type of weather and acquire the probabilities of transfer between each weather type, an expression being:

$$P_k = \frac{N_k}{N_1}, \quad (1)$$

in formula (1), $P_k$ being the probability of transfer of the clear weather to another weather type, k representing a weather type, $N_k$ being a number of times of transfer and $N_1$ being a number of times of occurrence of the clear weather.

In an implementation mode of the embodiment of the disclosure, the device further includes: a probability acquisition unit, configured to sequentially obtain the probabilities of transfer between the other weather types by virtue of a method for calculating the probabilities of transfer of the clear weather to the other weather types.

In an implementation mode of the embodiment of the disclosure, the generation unit is further configured to: sequentially and randomly extract the weather types and corresponding relative outputs within the preset time scale according to the probabilities of transfer between each weather type, and calculate products of the relative output and a predetermined threshold value to generate the simulated time sequence of the photovoltaic output, wherein the simulated time sequence is a curve chart, and is configured to reflect changes of a PDF, ACF and short-duration fluctuation characteristic of photovoltaic output of multiple time scales;

the short-duration fluctuation characteristic is a maximum PDF of the photovoltaic output within a time scale t, 15 min≤t≤60 min;

the maximum PDF is a difference value between a maximum output and a minimum output within the time scale t; and the difference value is positive if the maximum output appears after the minimum output, and the difference value is negative if it appears before the minimum output.

In an implementation mode of the embodiment of the disclosure, the evaluation unit is further configured to:

define the PDF $C_f$, short-duration fluctuation characteristic $C_d$ and ACF $C_r$ of the simulated time sequence respectively; and adopt an RMSE of each characteristic to quantitatively evaluate the validity of the time sequence, an expression being:

$$RMSE = \sqrt{\frac{1}{n} \cdot \sum_{i=1}^{n} (\hat{y}_i - y_i)^2},$$

where $\hat{y}_i \in [C_f, C_d, C_r]$, $\hat{y}_i$ is a unit vector, and represents a function value of each characteristic of the simulated time sequence, $y_i$ represents a function value of each characteristic, corresponding to each characteristic of the simulated time sequence, of a historical time sequence, n is a length of a function value set of each characteristic of the time sequence, RMSE is smaller than ε with a value range of 0.1~0.2.

It should finally be noted that: the above embodiments are adopted to not limit but only describe the technical solutions of the disclosure, and although the disclosure has been described with reference to the above embodiments in detail, those skilled in the art should understand that: modifications or equivalent replacements may still be made to the specific implementation modes of the disclosure, and any modifications or equivalent replacements made without departing from the spirit and scope of the disclosure shall fall within the scope of the claims of the disclosure.

INDUSTRIAL APPLICABILITY

By adopting the embodiments of the disclosure, the Markov chain is adopted to simulate the transfer processes of each type of weather and calculate the probabilities of transfer between each weather type; and uncertain characteristics such as randomness and fluctuation of photovoltaics are simulated, and compared with other methods, a building structure is more consistent with characteristics of the photovoltaic output, and truthfully and accurately represent a future photovoltaic output condition. Annual and monthly photovoltaic output simulation time sequences consistent with a random fluctuation rule of a photovoltaic time sequence may be generated according to a requirement to provide indispensable basic data for analogue simulation of time sequence production including massive new energy, annual new energy resource consumption capability analysis and annual planning.

The invention claimed is:

1. A method for modeling a long-time-scale photovoltaic output time sequence, comprising:
   acquiring historical data of a photovoltaic power station, and selecting a photovoltaic output with a time length of one year and a time resolution of 15 mins;
   acquiring weather types of days corresponding to the photovoltaic output, the weather types comprising at least one of clear weather, cloudy weather, overcast weather or changing weather;
   calculating probabilities of transfer between each type of weather respectively;
   sequentially and randomly extracting the weather types and corresponding relative outputs within a preset time scale according to the probabilities of transfer between each weather type, and calculating products of the relative outputs and a predetermined threshold value to generate a simulated time sequence of the photovoltaic output within the preset time scale;
   verifying validity of the simulated time sequence; and
   managing a power system by using the validated simulated time sequence;
   wherein verifying the validity of the simulated time sequence comprises:
   defining a Probability Density Function (PDF) $C_f$, a short-duration fluctuation characteristic $C_d$ and an Autocorrelation Function (ACF) $C_r$ of the simulated time sequence respectively; and adopting a Root-Mean-Square Error (RMSE) of each characteristic to quantitatively evaluate the validity of the time sequence, an expression being:

$$RMSE = \sqrt{\frac{1}{n}\sum_{i=1}^{n}(\hat{y}_i - y_i)^2}$$

where $\hat{y} \in [C_f, C_d, C_r]$, $\hat{y}_i$, is a unit vector and represents a function value of each characteristic of the simulated time sequence, $y_i$ represents a function value of each characteristic, corresponding to each characteristic of the simulated time sequence, of a historical time sequence, n is a length of a function value set of each characteristic of the time sequence, RMSE is smaller than ε with a value of 0.1.

2. The method according to claim 1, wherein calculating the probabilities of transfer between each type of weather respectively comprises: adopting a Markov chain to simulate transfer processes of each type of weather and acquire the probabilities of transfer between each weather type, an expression being:

$$P_k = \frac{N_k}{N_1}, \qquad (1)$$

in formula (1), $P_k$ being the probability of transfer of the clear weather to another weather type, k representing a weather type, $N_k$ being a number of times of transfer and $N_1$ being a number of times of occurrence of the clear weather.

3. The method according to claim 2, further comprising: sequentially obtaining the probabilities of transfer between the other weather types by virtue of a method for calculating the probabilities of transfer of the clear weather to the other weather types.

4. A device for modeling a long-time-scale photovoltaic output time sequence, comprising:
a memory storing computer-executable instructions; and
one or more processors executing the computer-executable instructions to implement a plurality of program units, wherein the plurality of program units comprises:
a data acquisition unit, configured to acquire historical data of a photovoltaic power station, and select a photovoltaic output with a time length of one year and a time resolution of 15 mins;
an acquisition unit, configured to acquire weather types of days corresponding to the photovoltaic output from a weather station, the weather types comprising at least one of clear weather, cloudy weather, overcast weather or changing weather;
a processing unit, configured to calculate probabilities of transfer between each type of weather respectively;
a generation unit, configured to sequentially and randomly extract the weather types and corresponding relative outputs within a preset time scale according to the probabilities of transfer between each weather type, and calculate products of the relative outputs and a predetermined threshold value to generate a simulated time sequence of the photovoltaic output within the preset time scale; and
an evaluation unit, configured to verify validity of the simulated time sequence, and manage a power system by using the validated simulated time sequence;

wherein verifying the validity of the simulated time sequence comprises:
defining a Probability Density Function (PDF) $C_f$, a short-duration fluctuation characteristic $C_d$ and an Autocorrelation Function (ACF) $C_r$ of the simulated time sequence respectively; and
adopting a Root-Mean-Square Error (RMSE) of each characteristic to quantitatively evaluate the validity of the time sequence, an expression being:

$$RMSE = \sqrt{\frac{1}{n}\sum_{i=1}^{n}(\hat{y}_i - y_i)^2}$$

where $\hat{y} \in [C_f, C_d, C_r]$, $\hat{y}_i$, is a unit vector and represents a function value of each characteristic of the simulated time sequence, $y_i$ represents a function value of each characteristic, corresponding to each characteristic of the simulated time sequence, of a historical time sequence, n is a length of a function value set of each characteristic of the time sequence, RMSE is smaller than ε with a value of 0.1.

5. The device according to claim 4, wherein the processing unit is further configured to: adopt a Markov chain to simulate transfer processes of each type of weather and acquire the probabilities of transfer between each weather type, an expression being:

$$P_k = \frac{N_k}{N_1}, \qquad (1)$$

in formula (1), $P_k$ being the probability of transfer of the clear weather to another weather type, k representing a weather type, $N_k$ being a number of times of transfer and $N_1$ being a number of times of occurrence of the clear weather.

6. The device according to claim 5, wherein the plurality of program units further comprises: a probability acquisition unit, configured to sequentially obtain the probabilities of transfer between the other weather types by virtue of a method for calculating the probabilities of transfer of the clear weather to the other weather types.

7. A non-transitory computer-readable storage medium having stored therein instructions that, when executed by a processor, causes the processor to perform a method for modeling a long-time-scale photovoltaic output time sequence, the method comprising
acquiring historical data of a photovoltaic power station, and selecting a photovoltaic output with a time length of one year and a time resolution of 15 mins;
acquiring weather types of days corresponding to the photovoltaic output, the weather types comprising at least one of clear weather, cloudy weather, overcast weather or changing weather;
calculating probabilities of transfer between each type of weather respectively;
sequentially and randomly extracting the weather types and corresponding relative outputs within a preset time scale according to the probabilities of transfer between each weather type, and calculating products of the relative outputs and a predetermined threshold value to generate a simulated time sequence of the photovoltaic output within the preset time scale;

verifying validity of the simulated time sequence; and
managing a power system by using the validated simulated time sequence;
wherein verifying the validity of the simulated time sequence comprises:
defining a Probability Density Function (PDF) $C_p$, a short-duration fluctuation characteristic $C_d$ and an Autocorrelation Function (ACF) $C_r$ of the simulated time sequence respectively; and
adopting a Root-Mean-Square Error (RMSE) of each characteristic to quantitatively evaluate the validity of the time sequence, an expression being:

$$RMSE = \sqrt{\frac{1}{n}\sum_{i=1}^{n}(\hat{y}_i - y_i)^2}$$

where $\hat{y} \in [C_p, C_d, C_r]$, $\hat{y}_i$ is a unit vector and represents a function value of each characteristic of the simulated time sequence, $y_i$ represents a function value of each characteristic, corresponding to each characteristic of the simulated time sequence, of a historical time sequence, n is a length of a function value set of each characteristic of the time sequence, RMSE is smaller than ε with a value of 0.1.

8. The non-transitory computer-readable storage medium according to claim 7, wherein the step of calculating the probabilities of transfer between each type of weather respectively comprises: adopting a Markov chain to simulate transfer processes of each type of weather and acquire the probabilities of transfer between each weather type, an expression being:

$$P_k = \frac{N_k}{N_1}, \qquad (1)$$

in formula (1), $P_k$ being the probability of transfer of the clear weather to another weather type, k representing a weather type, $N_k$ being a number of times of transfer and $N_1$ being a number of times of occurrence of the clear weather.

9. The non-transitory computer-readable storage medium according to claim 8, the method further comprises: sequentially obtaining the probabilities of transfer between the other weather types by virtue of a method for calculating the probabilities of transfer of the clear weather to the other weather types.

* * * * *